United States Patent
Gorohata et al.

(10) Patent No.: US 6,836,046 B2
(45) Date of Patent: *Dec. 28, 2004

(54) STATOR COIL INCLUDING SEQUENTIALLY-CONNECTED CONDUCTOR SEGMENTS FOR AN ELECTRIC ROTARY MACHINE

(75) Inventors: Tetsuya Gorohata, Anjo (JP); Youichi Kamakura, Anjo (JP); Hitoshi Hirano, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/600,840

(22) Filed: Jun. 23, 2003

(65) Prior Publication Data

US 2003/0234592 A1 Dec. 25, 2003

(30) Foreign Application Priority Data

Jun. 25, 2002 (JP) ........................................ 2002-185235

(51) Int. Cl.⁷ ................................................. H02K 3/32
(52) U.S. Cl. ....................................... 310/180; 310/201
(58) Field of Search ............................... 310/179, 180, 310/184, 201, 208

(56) References Cited

U.S. PATENT DOCUMENTS

| | | | | |
|---|---|---|---|---|
| 5,619,088 A | | 4/1997 | Yumiyama et al. ......... 310/208 |
| 5,986,375 A | * | 11/1999 | Umeda et al. .............. 310/180 |
| 6,051,906 A | | 4/2000 | Umeda et al. .............. 310/208 |
| 6,177,747 B1 | | 1/2001 | Maeda et al. |
| 6,222,295 B1 | * | 4/2001 | Umeda et al. .............. 310/179 |
| 6,249,956 B1 | | 6/2001 | Maeda et al. |
| 6,376,960 B1 | * | 4/2002 | Milet et al. ................. 310/180 |
| 6,388,358 B1 | | 5/2002 | Umeda et al. |
| 6,403,921 B1 | | 6/2002 | Maeda et al. |
| 6,492,757 B2 | * | 12/2002 | Nakamura et al. .......... 310/180 |
| 6,498,414 B2 | * | 12/2002 | Asao .......................... 310/184 |
| 6,552,463 B2 | * | 4/2003 | Oohashi et al. ............. 310/207 |
| 6,717,317 B2 | * | 4/2004 | Akita et al. ................. 310/184 |

FOREIGN PATENT DOCUMENTS

| | | |
|---|---|---|
| DE | 1 005 611 | 4/1957 |
| JP | 2000-139049 | 5/2000 |
| JP | 2000-166148 | 6/2000 |
| JP | 3104700 | 9/2000 |
| JP | 3118837 | 10/2000 |
| JP | 3196738 | 6/2001 |

* cited by examiner

Primary Examiner—Tran Nguyen
(74) Attorney, Agent, or Firm—Oliff & Berridge, PLC

(57) ABSTRACT

A swerved portion is provided on a tail slanting portion of a large-turning conductor segment or on a tail slanting portion of the small-turning conductor segment. The swerved portion is located in the vicinity of a tail joint portion so as to define a radial clearanced between the tail slanting portions.

4 Claims, 13 Drawing Sheets

541a~544a : ROTARY DRIVING MECHANISMS
54b : AXIAL DRIVING MECHANISM
55 : CONTROLLER

US 6,836,046 B2

STATOR COIL INCLUDING SEQUENTIALLY-CONNECTED CONDUCTOR SEGMENTS FOR AN ELECTRIC ROTARY MACHINE

BACKGROUND OF THE INVENTION

This invention relates to a stator coil including serially-connected conductor segments (which may be referred to as a serial-joint segmental stator core, hereinafter) for an electric rotary machine and also relates to its manufacturing method.

A conventionally proposed stator coil consists of numerous conductor segments which are inserted into slots of a stator core and serially connected to each other. For example, Japanese Patent No. 3118837 discloses a method of manufacturing this type of coil which includes U-shaped conductor segments being serially connected.

According to this kind of serial-joint segmental stator coil, a pair of legs of a conductor segment is separately inserted into different slots spaced by an angle equivalent to a pole pitch. A protruding part of each leg is bent in the circumferential direction. Then, the distal ends of the legs of different conductor segments are successively joined.

More specifically, the conductor segment consists of a U-shaped (more accurately, a V-shaped) head conductor portion (also referred to as a curved or turning portions), a pair of in-slot conductor portions extending from both ends of the head conductor portion and inserted into different slots from one axial side of a core, and a pair of tail conductor portions protruding out of the slots from the other axial side of the core and extending in the circumferential directions. The distal ends of the tail conductor portions of different conductor segments are joined together. In this specification, the in-slot conductor portion and the tail conductor portion may be collectively referred to as a leg of the conductor segment. Accordingly, the head conductor portions of respective conductor segments cooperatively constitute a head side coil end. The tail conductor portions of respective conductor segments cooperatively constitute a tail side coil end.

Furthermore, Japanese Patent No. 3118837 discloses a small-turning conductor segment and a large-turning conductor segment surrounding the small-turning conductor segment so as to cooperatively constitute a conductor segment set. A total of four legs of the conductor segment set are separately held by two rings coaxially disposed. A pair of legs of each conductor segment is expanded in the circumferential direction by causing a relative rotation between two rings to form head slanting portions.

Furthermore, Japanese Patent Application Laid-open No. 2000-139049 discloses a stator core with numerous slots into which small-turning conductor segments and large-turning conductor segments surrounding the small-turning conductor segments are inserted so as to cooperatively constitute conductor segment sets. A total of four legs of the conductor segment set are separately held by four rings coaxially disposed. A pair of legs of each conductor segment is expanded in the circumferential direction by causing a relative rotation between these rings to form head slanting portions.

Moreover, Japanese Patent No. 3104700 discloses a process of welding a pair of distal end portions of adjacent conductor segments disposed in the radial direction, and also discloses providing an intervening member between two distal end portions of adjacent conductor segments disposed in the circumferential direction.

Japanese Patent Application Laid-open No. 2000-166148 discloses a tail side coil end including a large-turning conductor segment and a small-turning conductor segment having recessed portions which are formed in the vicinity of tail joint portions and respectively extend along opposed sides of their tail slanting portions. According to this arrangement, two tail slanting portions are disposed next to each other in the radial direction and the radial width of each slanting portion is thin in the crossing portion of these tail slanting portions (refer to FIG. 13).

Hereinafter, a conventional method for manufacturing this kind of serial-joint segmental stator coil disclosed in the above-described prior art documents will be explained.

First, a required number of pine-needle shaped conductor segments are prepared. Next, each pine-needle shaped conductor segment is configured into a U-shaped conductor segment with a pair of in-slot conductor portions angularly spaced by one pole pitch in the circumferential direction. Then, the U-shaped conductor segments are spatially disposed (more specifically, aligned in the circumferential direction) so that a required number of conductor segments are simultaneously inserted into the slots of the stator core. For the above-described process, it is possible to use a pair of coaxial rings having insertion holes, for example, disclosed in FIG. 3 of Japanese Patent No. 3118837. According to the manufacturing process shown in this prior art, both legs of a pine-needle shaped conductor segment are separately inserted into two holes of the coaxial rings which are in the same angular position. Then, the coaxial rings are mutually rotated about their axes by the amount corresponding to one pole pitch in the circumferential direction. As a result, each pine-needle shaped conductor segment is configured into a U-shaped conductor segment with a head portion straddling so as to form, as a whole, a U shape (or V shaped) in the circumferential direction.

Next, a process of inserting respective conductor segments, formed into a U-shaped configuration and aligned in the circumferential direction, into corresponding slots of the core is performed. This process is performed by pulling the legs out of the rings having insertion holes, while holding the head conductor portions of respective conductor segments each being formed into a U-shaped configuration and aligned in the circumferential direction, and then inserting the legs of respective conductor segments into slots of the core.

Next, a process for bending each tail conductor portion protruding out of the slot in the circumferential direction is performed. Preferably, each tail conductor portion is bent in the circumferential direction by a half pole pitch. Such circumferential bending process is performed by using a plurality of coaxial rings having insertion holes, for example, disclosed in FIGS. 4 and 5 of Japanese Patent No. 3196738. The distal ends of respective tail conductor portions are inserted into insertion holes of the coaxial rings. Then, each coaxial ring is rotated in the circumferential direction by a half pole pitch (electric angle of $\pi/2$), so that each tail conductor portion is bent in the circumferential direction by a half pole pitch. When each coaxial ring is rotated in the circumferential direction, it is preferable to urge the coaxial ring in the axial direction so as to advance toward the tail conductor portion. The radius of curvature at the bend point can be enlarged. Next, the process of welding the distal end portions of the tail conductor portions is performed according to the predetermined order.

Through the above-described processes, an endless phase coil, as a coil representing one of the phases, is formed. To form leader terminals of each phase coil at the head side, one of the U-shaped head conductor portions of the U-shaped conductor segments is cut at an appropriate position. When the leader terminals are formed long enough, the leader portions can be bent in the circumferential direction so as to provide a connecting wire for a neutral point. The reason why such leader terminals are formed at the head side coil end is to avoid the interference with the welding operation performed at the tail side coil end.

The above-described conventional serial-joint segmental stator coils are preferably used for automotive alternators.

However, the above-described serial-joint segmental stator coils have the following problems.

More specifically, according to the tail slanting portions with the recessed portions as disclosed in the above-described Japanese Patent Application Laid-open No. 2000-166148 (refer to FIG. 13), the press shaping is used to reduce the radial thickness at the recessed portions.

To suppress the increase in the coil resistance caused by the reduction of the cross-sectional area of the conductor when subjected to the press shaping, and also to prevent the interference between the tail slanting portions disposed adjacently in the circumferential direction due to increase of the circumferential width of the conductor, the tail slanting portions are significantly chamfered at the portions where the recessed portions are not formed. The recessed portions subjected to the press shaping have the non-chamfered cross-sectional shape.

However, increasing the sectional rectangle rate (i.e., the reciprocal of chamfering rate) to compensate the reduction in the cross-sectional area of the tail slanting portion at the above-described recessed portion will require the original sectional rectangle rate being set at a small value and also require the sectional rectangle rate obtained after finishing the press shaping to be increased to the level having no chamfering. As a result, an excessively large stress will act on the insulation film covering the conductor segment.

Furthermore, the sectional rectangle rate (=actual cross section/rectangular cross section having the same width and height) of the in-slot conductor portion decreases and accordingly the slot space factor of the slot is worsened. Furthermore, when the original conductor segment has a high sectional rectangle rate, this is unfeasible.

Especially, performing the press shaping for reducing the radial thickness of the tail slanting portion from one side so as to change the sectional rectangle rate will require clamping each tail slanting portion in the circumferential direction to prevent the tail slanting portion from stretching in the circumferential or radial direction. However, clamping the tail slanting portion will damage the insulation film covering the conductor segment.

SUMMARY OF THE INVENTION

In view of the foregoing problems of the prior arts, an object of the present invention is to prevent the insulation film from being subjected to a large stress and assure reliable electric insulation between the tail conductor portions.

In order to accomplish the above and other related objects, the present invention provides a stator coil including sequentially-connected conductor segments for an electric rotary machine, including a plurality of conductor segments accommodated in a slot of a stator core having an even number of conductor accommodation positions serially aligned in the radial direction. The conductor segments are sequentially connected to cooperatively constitute one turn of a phase coil of an M-phase (M is an integer not smaller than 3) armature coil. Each of the conductor segments has a pair of in-slot conductor portions separately accommodated into the conductor accommodation positions of two different slots mutually spaced by a predetermined pitch, a head conductor portion continuously extending from the in-slot conductor portions and protruding from one end of the stator core so as to constitute a head side coil end, and a pair of tail conductor portions continuously extending from the in-slot conductor portions and protruding from the other end of the stator so as to constitute a tail side coil end. The head conductor portion has a U-shaped head top portion, and a pair of head slanting portions extending obliquely in both circumferential and axial directions from the head top portion and respectively connected to the in-slot conductor portions. The tail conductor portions has a pair of tail slanting portions extending obliquely in both circumferential and axial directions from the pair of in-slot conductor portions, and tail joint portions formed at distal ends of the tail slanting portions and bonded to tail conductor portions of other conductor segment. The head side coil end includes a plurality of head conductor portions serially disposed in the radial direction when seen from the circumferential direction. And, the tail side coil end includes a plurality of tail conductor portions serially disposed in the radial direction when seen from the circumferential direction. Furthermore, as characteristic features of the stator coil according to the present invention, the conductor segments include a small-turning conductor segment inserted into a pair of conductor accommodation positions disposed next to each other in the radial direction, and a large-turning conductor segment inserted into another pair of conductor accommodation positions respectively disposed next to the above pair of conductor accommodation positions in the radial direction. The tail joint portion of the large-turning conductor segment is bonded to the tail joint portion of the small-turning conductor segment located adjacently in the radial direction. The tail slanting portion of the large-turning conductor segment or the small-turning conductor segment has a swerved portion which bends toward a direction departing from the opposed conductor segment so as to expand a radial clearance between the large-turning conductor segment and the small-turning conductor segment at a crossing portion of the tail slanting portion of the large-turning conductor segment and the tail slanting portion of the small-turning conductor segment which are adjacently disposed in the radial direction.

Namely, according to the present invention, the large-turning or small-turning conductor segment has the swerved portion formed in the vicinity of the tail joint portion so as to bend in the radial direction, instead of forming the recessed portion at one side of the tail slanting portion based on the increase in the above-described sectional rectangle rate. Formation of the recessed portion according to the present invention is not inferior to that of the above-described conventional art in that a sufficient cross section of the conductor segment can be secured. Even when the insulation film covering the tail slanting portion of the large-turning conductor segment is softened or fused when the paired tail joint portions are welded, the insulating film does not contact with the insulating film covering the tail slanting portion of the neighboring small-turning conductor segment which is in a cross relationship with the tail slanting portion of the above large-turning conductor segment. As a result, it becomes possible to adequately maintain the electric insulation between two tail slanting portions crossing with each other.

Furthermore, formation of the recessed portion according to the present invention does not require a complicated technique adopted in the above-described conventional method for increasing the sectional rectangle rate for deforming the tail slanting portion in the radial direction while clamping it in the circumferential direction. Furthermore, no strong stress acts on the insulation film at the sectionally edged portion of the tail slanting portion. Substantially no damage will be caused in the insulation film. The electric insulation can be maintained appropriately. The present invention can be preferably applied to high-voltage motor, such as a vehicle drive motor.

According to the stator coil of the present invention, it is preferable that a plurality of conductor segment sets, each consisting of the large-turning conductor segment and the small-turning conductor segment, are disposed in the radial direction. And, a gap between a pair of conductor segment sets disposed next to each other in the radial direction and a gap between a pair of small-turning conductor segments disposed next to each other in the radial direction are widened in the vicinity of the tail joint portions compared with the gaps in the vicinity of an end surface of the stator core.

According to the stator coil of the present invention, the swerved portion is formed by bending the tail slanting portion toward the radially opposite side. As a result, to prevent the curved portions of the conductor segments from contacting with each other, it is necessary to secure a sufficient radial clearance between neighboring conductor segment sets. Securing a sufficient radial clearance between neighboring conductor segment sets will lead to reduction in the space factor of the slot.

Hence, the above arrangement makes it possible to curve or bend the tail slanting portion obliquely from the slot end surface in the radial direction. The swerved portion, formed in the vicinity of the tail joint portion, can protrude in the radial direction. Thus, it becomes possible to prevent the space factor of the slot from decreasing and also prevent the size of the stator core from increasing.

According to a preferable manufacturing method, the tail slanting portions inserted in the slots of the stator core are simultaneously tilted toward the radially outer side along the entire periphery of the stator core, so that the tail slanting portions incline to the radially outer side at the same time. According to this method, the gap between neighboring conductor segment sets disposed next to each other in the radial direction can be widened in the vicinity of the tail joint portions compared with the gap in the vicinity of an end surface of the stator core. It is needless to say that the tilt angle of the tail slanting portions toward the radially outer side is dependent on the radial position of respective tail slanting portions. The tail slanting portion positioned at the radially outer side has a larger tilt angle.

According to the stator coil of the present invention, it is also preferable that a plurality of conductor segment sets are disposed in the radial direction. Each conductor segment set is constituted by the small-turning conductor segment and the large-turning conductor segment. The small-turning conductor segment includes a small-turning head portion continuously formed with a pair of the in-slot conductor portions accommodated separately into a pair of conductor accommodation positions disposed next to each other in the radial direction. The large-turning conductor segment includes a large turning head portion straddling in the radial direction so as to surround the small-turning head portion. A group of conductor segment sets is located at the same radial position and disposed in the circumferential direction to constitute a partial phase coil to which a predetermined phase voltage is applied. And, the phase coil is constituted by serially connecting a plurality of partial phase coils having different radial positions and disposed sequentially in the radial direction.

Conventionally, the electric rotary machine using the serial-joint segmental stator coil is used for an automotive alternator. Meanwhile, it is expected that this kind of electric rotary machine is used for an automotive drive motor requiring a large output. To reduce the resistance loss caused in the stator coil and its wiring, it is necessary to supply an extremely high battery voltage (several hundreds V) to the drive motor. However, there is no substantial difference in the rotation between the segmental serial-joint type stator coil for a drive motor and the serial-joint segmental stator coil for an automotive alternator. Hence, the turn number of the serial-joint segmental stator coil for the drive motor must be increased so greatly.

Increasing the turn number of the serial-joint segmental stator coil will result in the increase in the wiring resistance. As shown in FIG. 14, the conductor segments 33*a* to 33*e* are laminated so as to form surrounded multiple layers of the conductor segments (e.g., 5 layers according to the example shown in FIG. 14). When the turn number of the serial-joint segmental stator coil is increased, the number of the in-slot conductor segments disposed in the radial direction in the slot S is increased. According to this kind of multilayered surrounded conductor segments type, many kinds of rounded conductor segments for the coil end are required by the same number as that of the laminated layers. As the outermost rounded conductor segment 33*e* becomes long, the overall wiring resistance increases.

Especially, due to manufacturing reasons, the rounded distal end portion H of the U-shaped conductor segment tends to have a radial width larger than that of its proximal end portion L. Although not illustrated in FIG. 14, the actual radial width W of a head side coil end 311 becomes large. The axial length of the head side coil end 311 also becomes large. The axial length of the motor is increased. The volume and weight of the motor is increased.

Furthermore, as described above, the radial width of the distal end portion H of the U-shaped conductor segment becomes larger than that of the proximal end portion L. To prevent the conductor segments from colliding with each other when they are expanded, it is necessary to secure sufficient clearance d between adjacent conductor segments disposed closely to the proximal end side of the coil end. The space factor of the slot will decrease in accordance with the increase of the clearance d.

Furthermore, the above-described surrounded multilayered structure of the conductor segments worsens the heat radiation properties of the innermost conductor segment 33*a*.

To solve the above-described problems, according to this arrangement, as shown in FIG. 3, there are provided a plurality of conductor segment sets disposed in the radial direction, each of which occupies four consecutive conductor accommodation positions aligned in the radial direction in the slot. A predetermined number of conductor segment sets disposed in the circumferential direction are serially connected to constitute a partial phase coil. The phase coil is constituted by sequentially connecting the partial phase coils which are disposed in the radial direction and constituted by a plurality of conductor segment sets located at different radial positions.

According to this arrangement, the partial phase coils neighboring in the radial direction can be easily connected by using modified U-shaped conductor segments. Moreover, there is no substantial difference in the temperature and also in the wiring length between the conductor segment sets (i.e., partial phase coils) located at different radial positions. The current distribution does not concentrate locally. Excessive heat will not be produced locally. Increasing the turn number of the coil can be easily realized.

According to the stator coil of the present invention, it is also preferable that an inphase slot group is constituted by a plurality of slots adjacently and continuously disposed in the circumferential direction for accommodating in-slot conductor portions to which the same inphase voltage is applied. A plurality of serial phase coil circuits are accommodated in different slots of the inphase slot group, each serial phase coil circuit including serially connected partial phase coils accommodated in the same slot and disposed sequentially in the radial direction to have different radial positions. And, the phase coil is constituted by connecting the plurality of serial phase coil circuits in parallel with each other.

Conventionally, the electric rotary machine using the serial-joint segmental stator coil is used for an automotive alternator. Meanwhile, it is expected that this kind of electric rotary machine is used for an automotive drive motor requiring a large output. Generating a large output requires a large current. However, there is a limit in increasing the cross-sectional area of conductor segments for realizing the required large current. Hence, it is necessary to connect the partial phase coils in parallel with each other to increase an overall cross-sectional area of the phase coil. However such a parallel connection requires additional connecting wires and accordingly cannot be easily realized by sequentially connecting the conductor segments.

In view of the above, according to this arrangement, the phase coil is a serial phase coil circuit. There are provided a plurality of serial phase coil circuits. Each serial phase coil circuit is accommodated in different slots cooperatively constituting an inphase slot group. According to this arrangement, it is possible to eliminate the wiring resistance difference between respective serial phase coil circuits. Furthermore, it is possible to reduce the current difference between respective partial phase coils. Especially, even if there is some resistance difference between the partial phase coils located at different radial positions, the above-described capability of eliminating the resistance difference between respective serial phase coil circuits is very important.

Accordingly, this arrangement makes it possible to increase the turn number of the coil without using numerous kinds of conductor segments or without adding complicated or special connecting wires. Furthermore, it becomes possible to realize an excellent stator coil preferably used for an automotive drive motor to be operated under a high voltage.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Preferred embodiments of the present invention will be explained hereinafter with reference to attached drawings.

The electric rotary machine has a stator coil including sequentially connected conductor segments and is used for a high-voltage vehicle.

Figure 1:
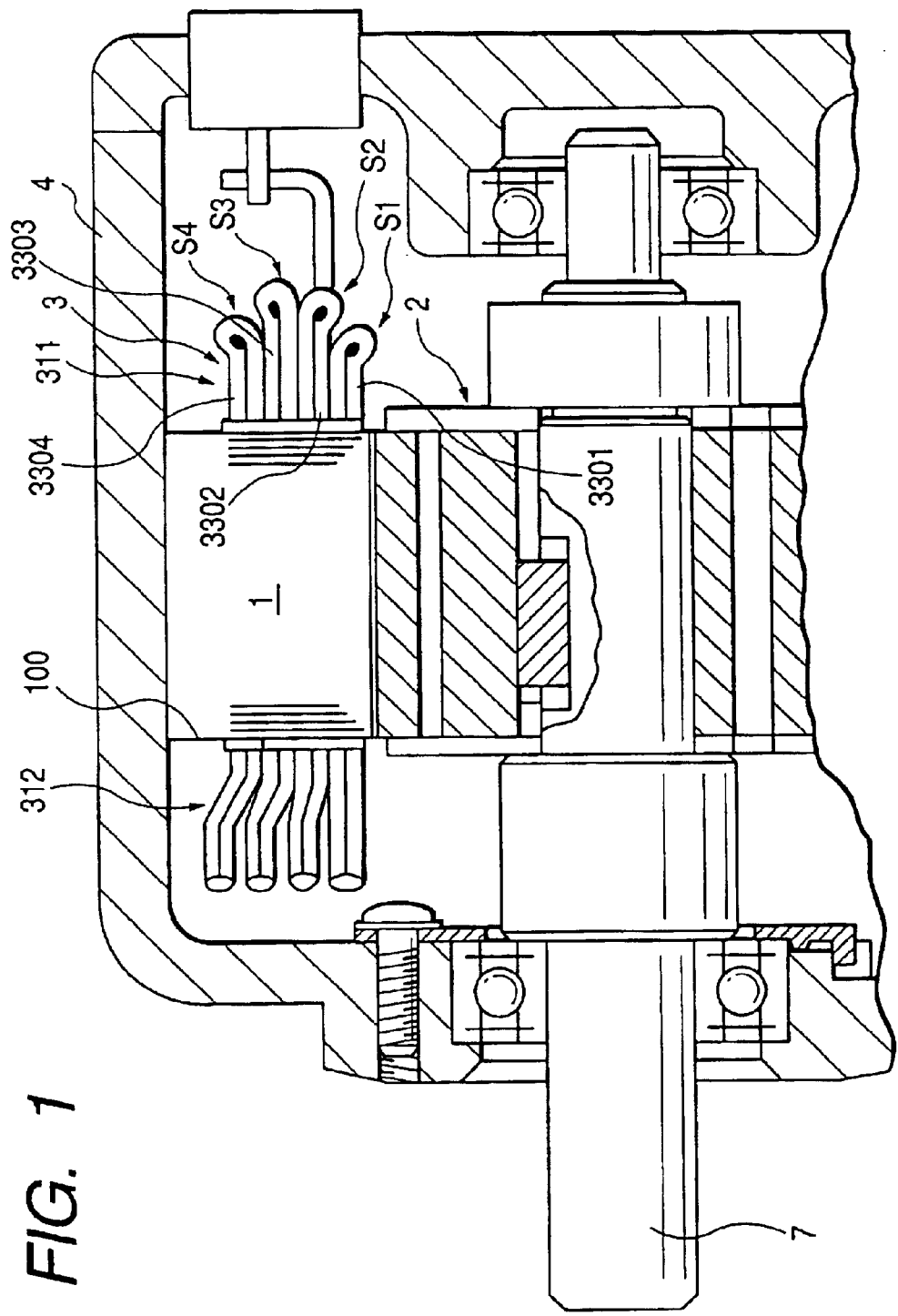
FIG. 1 is a vertical cross-sectional view showing a drive motor for an automotive vehicle in accordance with a first embodiment of the present invention.
Figure 2:
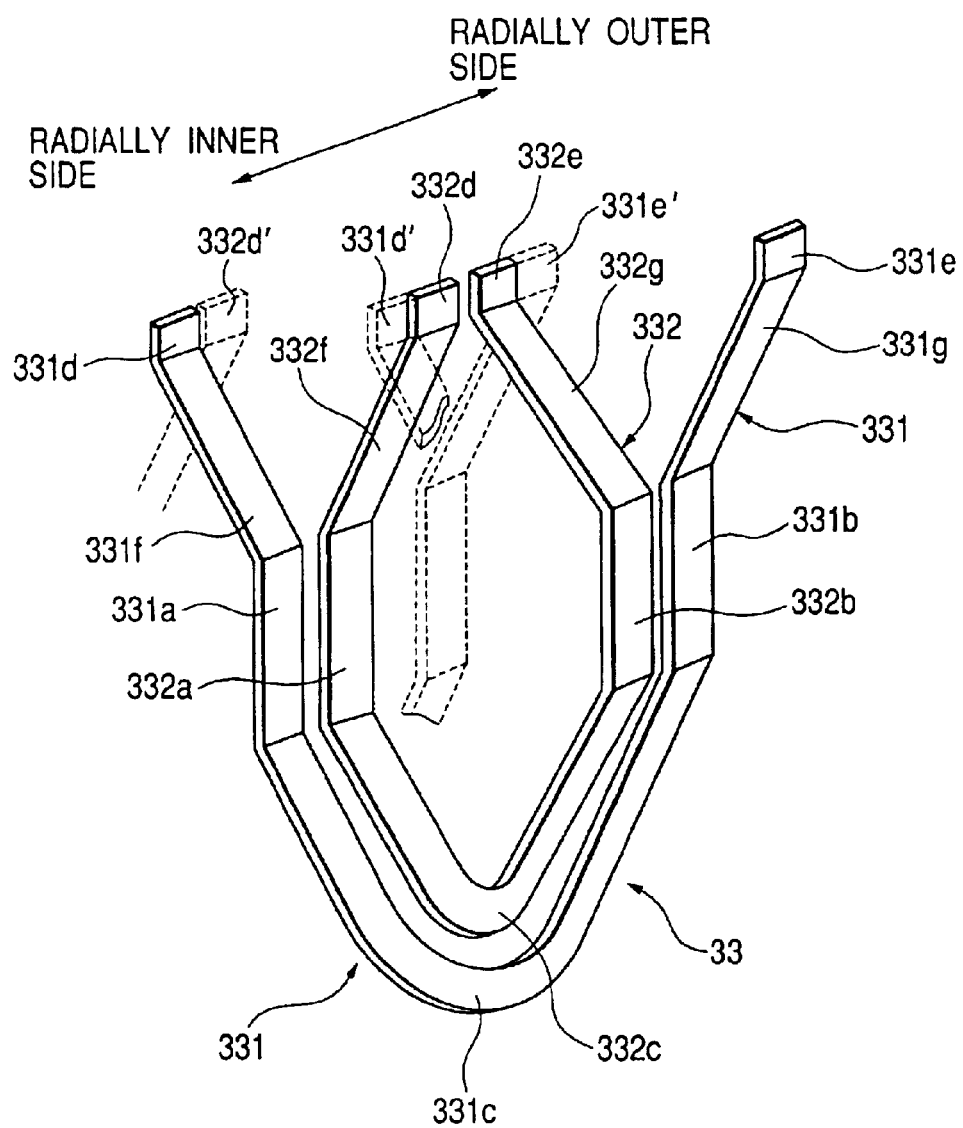
FIG. 2 is a perspective view schematically showing conductor segments shown in FIG. 1.
Figure 3:
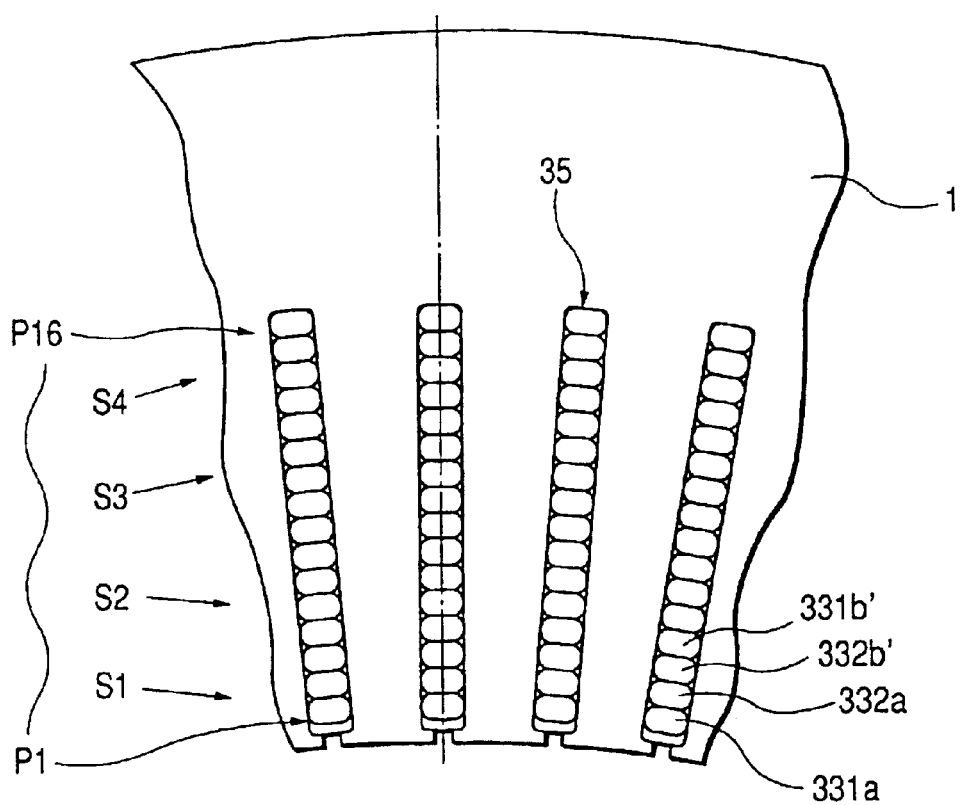
FIG. 3 is a cross-sectional view partly showing the stator core shown in FIG. 1, taken along a plane extending in the radial direction of the motor.

FIG. 1 is a cross-sectional view showing an electric rotary machine used as a drive motor for generating a drive power of a vehicle, taken along a plane including an axis of this electric rotary machine, although a coil end portion of the stator coil is schematically shown. FIG. 2 is a perspective view showing conductor segments serving as part of a stator coil. FIG. 3 is a cross-sectional and partial view showing the condition of conductor segments accommodated in each slot.

Overall Arrangement

As shown in FIG. 1, the drive motor includes a stator core 1, a rotor 2, a stator coil 3, a housing 4, and a rotary shaft 7. The stator core 1 is fixed on an inner cylindrical wall of the housing 4. The stator coil 3 is wound in each slot of the stator core 1. The rotor 3 is an IPM type rotor fixed to the rotary shaft 7. The rotary shaft 7 is rotatably supported inside the housing 4. The rotor 3 is disposed radially inside the stator core 1. The stator coil 3 is a three-phase armature winding. A three-phase inverter, which is connected to an external battery of approximately 300V, supplies electric power to the stator coil 3.

The drive motor is a permanent-magnet type three-phase brushless DC motor (i.e., synchronous motor) which generates a drive power of a secondary battery vehicle, or a fuel cell powered vehicle, or a hybrid vehicle. The rotor structure is replaceable with any other type of conventionally known synchronous motors, although the explanation for it is omitted in this specification.

Explanation of Stator Coil 3

The stator coil 3 is constituted by a predetermined number of conductor segments 33 (i.e., segment set defined in this invention) shown in FIG. 2. Each conductor segment 33, inserted into a slot of the stator core 1 from one side, extends in the slot and protrudes out of the stator core 1 from the other side. The protruding portion of the conductor segment 33, having a predetermined length, is twisted in the circumferential direction by an amount equivalent to an electric angle of $\pi/2$. The protruding portions of conductor segments 33 are welded at their distal ends (i.e., bonding portions) according to predetermined combinations. Each conductor segment 33 has an elongated plate body configured as a whole into U shape which is sheathed by a resin film except the distal ends of the protruding portions, i.e., except the distal end portions to be welded. This kind of stator coil itself, as characterized by sequentially-connected conductor segments, is already known.

The detailed arrangement of conductor segment (i.e., segment set) 33 is explained hereinafter.

Each conductor segment (i.e., segment set) 33 consists of a large conductor segment 331 and a small conductor segment 332, each including a substantially V-shaped head conductor portion, a pair of in-slot conductor portions, and a pair of protruding tail conductor portions. The in-slot conductor portions extend straight from bifurcated ends of the head conductor portion and are accommodated in slots. The protruding tail conductor portions extend outward from the corresponding in-slot conductor portions. In other words, the stator coil 3 consists of a first coil end portion (i.e., a head side coil end) 311, a second coil end portion (i.e., a tail side coil end) 312, and the in-slot conductor portion. The first coil end portion 311, formed as a whole into a ring shape, is disposed at one side of the stator core 1. The second coil end portion 312, formed as a whole into a ring shape, is disposed at the other side of the stator core 1. The in-slot conductor portion is disposed in the slot of the stator core 1.

Namely, in FIG. 1, the head side coil end 311 is constituted by the head conductor portions of respective conductor segments 33, while the tail side coil end 312 is constituted by the protruding tail conductor portions of respective conductor segments 33.

As shown in FIG. 1, a total of four groups of segment sets 33 are inserted in one slot and disposed serially in the radial direction. A first segment set group S1 is disposed at the innermost side of the slot, when seen in the radial direction. A second segment set group S2 is disposed outside of and next to the first segment set S1 when seen in the radial direction. A third segment set group S3 is disposed outside of and next to the second segment set S2 when seen in the radial direction. A fourth segment set group S4 is disposed at the outermost side of the slot, when seen in the radial direction.

In FIG. 1, reference numeral 3301 represents a head conductor portion of one conductor segment 33 serving as part of the first segment set group S1, reference numeral 3302 represents a head conductor portion of one conductor segment 33 serving as part of the second segment set group S2, reference numeral 3303 represents a head conductor portion of one conductor segment 33 serving as part of the third segment set group S3, and reference numeral 3304 represents a head conductor portion of one conductor segment 33 serving as part of the fourth segment set group S4.

The head conductor portions of the first to fourth segment set groups S1 to S4, disposed serially in the radial direction, cooperatively constitute the above-described head side coil end 311. For the purpose of simplifying the drawing, FIG. 1 shows only eight (four pairs of) tail conductor portions of two segment set groups arranged in the radial direction at the tail side coil end 312.

Explanation of Conductor Segment 33

The conductor segment (i.e., segment set) 33 will be explained in more detail with reference to FIG. 2.

The conductor segment (i.e., segment set) 33 includes a large conductor segment 331 (which may be referred to as a large-turning conductor segment) and a small conductor segment 332 (which may be referred to as a small-turning conductor segment). The large conductor segment 331 surrounds the small conductor segment 332. The large conductor segment 331 and the small conductor segment 332 are collectively referred to as a segment set.

The large conductor segment 331 consists of a head conductor portion 331c, a pair of in-slot conductor portions 331a and 331b, and a pair of tail conductor portions 331f and 331g. The tail conductor portions 331f and 331g have distal ends 331d and 331e which are portions to be welded. In this respect, the distal ends 331d and 331e can be also referred to as edge portions or joint portions. The in-slot conductor portion 331a is positioned in the innermost layer and accordingly may be referred to as the in-slot conductor portion of the innermost layer. The in-slot conductor portion 331b is positioned in the outermost layer and accordingly may be referred to as the in-slot conductor portion of the outermost layer.

The small conductor segment 332 consists of a head conductor portion 332c, a pair of in-slot conductor portions 332a and 332b, and a pair of tail conductor portions 332f and 332g. The tail conductor portions 332f and 332g have distal ends 332d and 332e which are portions to be welded. In this respect, the distal ends 332d and 332e can be also referred to as edge portions or joint portions. The in-slot conductor portion 332a is positioned in the inner middle layer and accordingly may be referred to as the in-slot conductor portion of the inner middle. The in-slot conductor portion 332b is positioned in the outer middle layer and accordingly may be referred to as the in-slot conductor portion of the outermost middle.

Regarding the symbol ' attached to the number in the drawing, it means that a portion accompanied by the symbol ' is identical with the portion denoted by the same reference numeral. Accordingly, in FIG. 2, the joint portions 331d and 332d', which are aligned next to each other in the radial direction, are welded together. Similarly, the joint portions 332d and 331d', which are aligned next to each other in the radial direction, are welded together. The joint portions 332e and 331e', which are aligned next to each other in the radial direction, are welded together.

According to FIG. 2, the in-slot conductor portion 331a of the innermost layer and the in-slot conductor portion 332a of the inner middle layer are accommodated in a predetermined slot of the stator core 1. In this case, the other in-slot conductor portion 331b of the conductor segment 331, positioned in the outermost layer, is accommodated in a different slot which is angularly offset from that of the in-slot conductor portion 331a by an amount equivalent to a predetermined odd number of pole pitch T (e.g., one magnetic pole pitch (=electric angle of $\pi$)). The other in-slot conductor portion 332b of the conductor segment 332, positioned in the outer middle layer, is accommodated in the same slot as that of the in-slot conductor portion 331b of the conductor segment 331. The head conductor portion 331c of the large conductor segment 331 surrounds the head conductor portion 332c of the small conductor segment 332 in the condition where the conductor segments 331 and 332 are disposed in the slots of stator core 1.

Layout of Segment Set in a Slot

FIG. 3 shows the layout of the segment sets accommodated in the slots of stator core 1.

Each slot 35 has a total of 16 conductor accommodation positions P1 to P16 aligned in the radial direction. Only one in-slot conductor portion is placed to each of the conductor accommodation positions P1 to P16. Each slot 35 can receive a total of four segment set groups S1 to S4 serially disposed in the radial direction. The conductor accommodation positions P1 to P4 are provided for accommodating the in-slot conductor portions of the first segment set group S1. The conductor accommodation positions P5 to P8 are provided for accommodating the in-slot conductor portions of the second segment set group S2. The conductor accommodation positions P9 to P12 are provided for accommodating the in-slot conductor portions of the third segment set group S3. The conductor accommodation positions P13 to P16 are provided for accommodating the in-slot conductor portions of the fourth segment set group S4. Each of the segment set groups S1 to S4 consists of a plurality of conductor segments 33.

Figure 4:
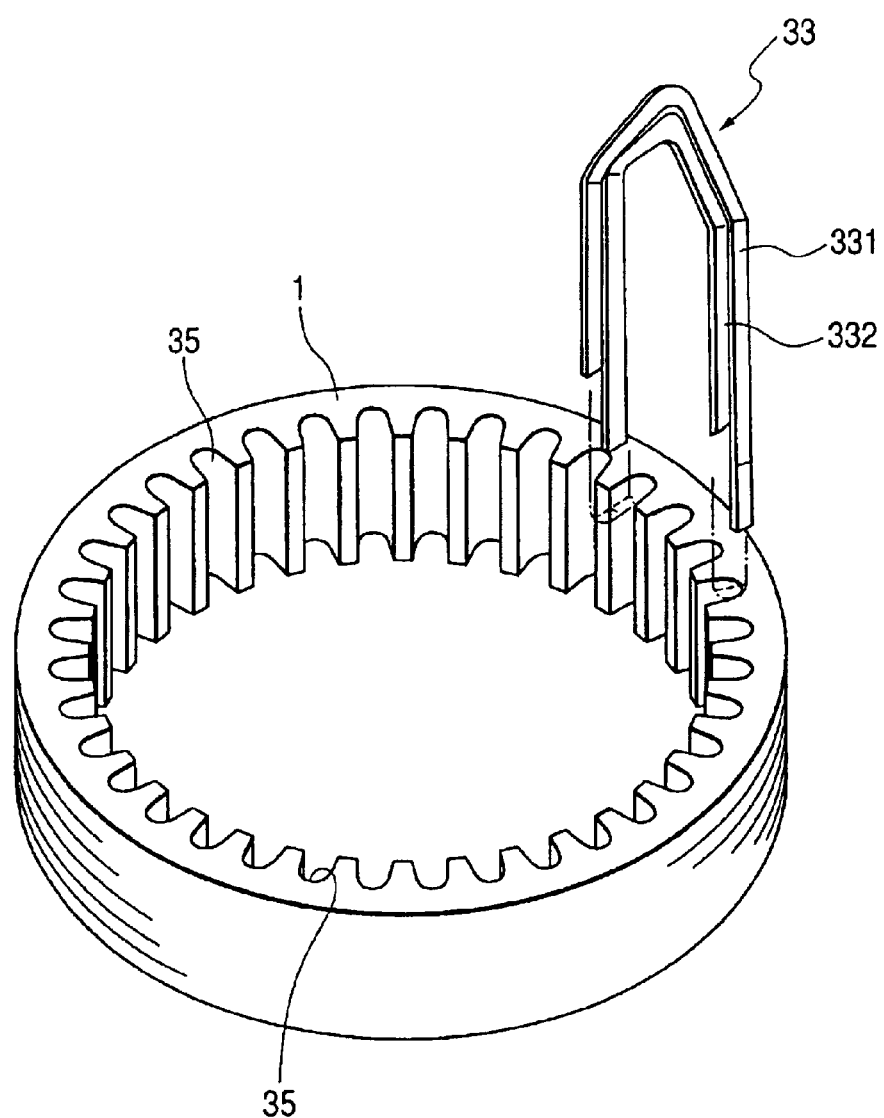
FIG. 4 is a perspective view schematically showing the condition of conductor segments immediately before they are installed into the slots of the stator core.

Hereinafter, the detailed explanation will be given with reference to the segment set group S1 located at the innermost side. The in-slot conductor portion 331a of the innermost layer is disposed at a radially innermost end of the slot 35 of stator core 1. Disposed radially outer side of the in-slot conductor portion 331a are successively, in this order, the in-slot conductor portion 332a of the inner middle layer, the in-slot conductor portion 332b' of the outer middle layer, and the in-slot conductor portion 331b' of the outermost layer. In short, each slot 35 accommodates four in-slot conductor portions of four layers aligned in the radial direction. In FIG. 3, the in-slot conductor portion 332b' belongs to a small conductor segment 332 which differs from the small conductor segment 332 having the in-slot conductor portion 332a. Similarly, the in-slot conductor portion 331b' belongs to a large conductor segment 331 which differs from the large conductor segment 331 having the in-slot conductor portion 331a. It is needless to say that each of other segment set groups S2 to S4 has the same layout and arrangement as those of the segment set group S1. FIG. 4 shows the condition of the conductor segment (i.e., segment set) 33 consisting of the large conductor segment 331 and the small conductor segment 332 which is inserted into the slots 35.

Explanation of the Arrangement of Three-phase Stator Coil

Figure 9:
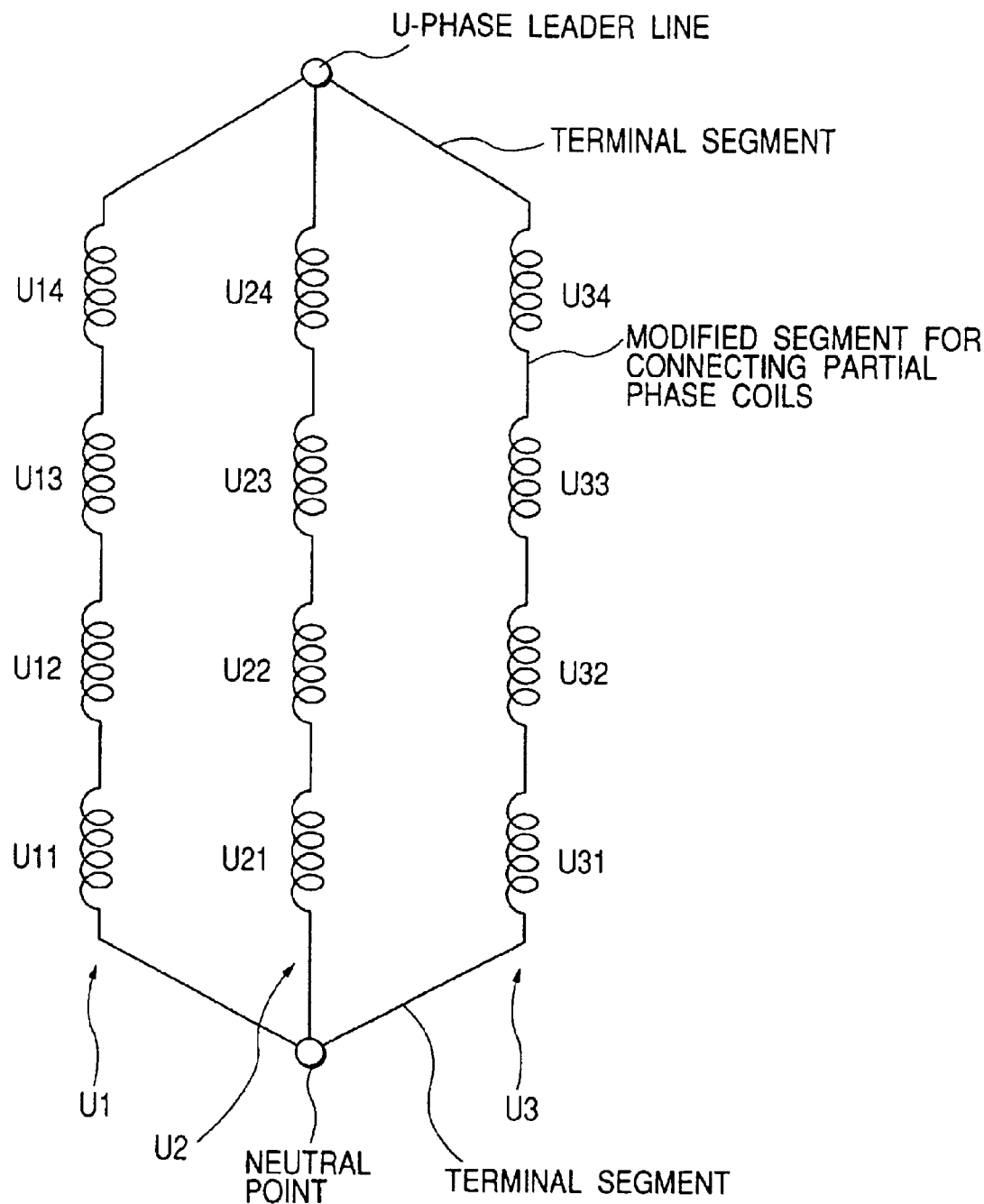
FIG. 9 is a view showing the U-phase wiring pattern of a stator coil.

The segment set groups S1 to S4, each being disposed in a 4-set arrangement in the radial direction, constitute a three-phase stator coil. FIG. 9 shows the wiring pattern of the U-phase coil serving as a part of the three-phase stator coil.

There are 9 slots (3 slots×3 phases) per magnetic pole pitch. The pole number is 12. In other words, a total of 108 slots are provided. Three adjacent slots constitute an inphase. slot group to which the same inphase voltage is applied. As described above, each slot has a total of 16 conductor accommodation positions P1 to P16. Only one in-slot conductor portion is accommodated at a corresponding conductor accommodation position.

The first segment set group S1, accommodated into the conductor accommodation positions P1 to P4 which are successive in the radial direction and disposed from the first to fourth positions when counted from the innermost end of the slot, is connected by wave winding so as to constitute three coils per each phase which are respectively referred to as first partial phase coils. FIG. 9 shows the first partial phase coils U11, U21, and U31. The first partial phase coils U11, U21, and U31 are separately accommodated in three different slots disposed adjacently to each other and cooperatively constituting an inphase slot group.

The second segment set group S2, accommodated into the conductor accommodation positions P5 to P8 which are successive in the radial direction and disposed from the fifth to eighth positions when counted from the innermost end of the slot, is connected by wave winding so as to constitute three coils per each phase which are respectively referred to as second partial phase coils. FIG. 9 shows the second partial phase coils U12, U22, and U32. The second partial phase coils U12, U22, and U32 are separately accommodated in three different slots disposed adjacently to each other and cooperatively constituting the inphase slot group.

The third segment set group S3, accommodated into the conductor accommodation positions P9 to P12 which are successive in the radial direction and disposed from the ninth to twelfth positions when counted from the innermost end of the slot, is connected by wave winding so as to constitute three coils per each phase which are respectively referred to as third partial phase coils. FIG. 9 shows the third partial phase coils U13, U23, and U33. The third partial phase coils U13, U23, and U33 are separately accommodated in three different slots disposed adjacently to each other and cooperatively constituting the inphase slot group.

The fourth segment set group S4, accommodated into the conductor accommodation positions P13 to P16 which are successive in the radial direction and disposed from the thirteenth to sixteenth positions when counted from the innermost end of the slot, is connected by wave winding so as to constitute three coils per each phase which are respectively referred to as fourth partial phase coils. FIG. 9 shows the fourth partial phase coils U14, U24, and U34. The fourth partial phase coils U14, U24, and U34 are separately accommodated in three different slots disposed adjacently to each other and cooperatively constituting the inphase slot group.

The partial phase coils U11, U12, U13, and U14 are accommodated in the first slot when counted from one end in the circumferential direction, among the three adjacent slots constituting the above-described inphase slot group. The partial phase coils U21, U22, U23, and U24 are accommodated in the middle slot when counted from one end in the circumferential direction, among the three adjacent slots constituting the above-described inphase slot group. The partial phase coils U31, U32, U33, and U34 are accommodated in the last slot when counted from one end in the circumferential direction, among the three adjacent slots constituting the above-described inphase slot group.

The partial phase coils U11, U12, U13, and U14 are serially connected in this order to cooperatively constitute a serial phase coil circuit U1. The partial phase coils U21, U22, U23, and U24 are serially connected in this order to cooperatively constitute a serial phase coil circuit U2. The partial phase coils U31, U32, U33, and U34 are serially connected in this order to cooperatively constitute a serial phase coil circuit U3. As conventionally known, the connection for connecting the partial phase coils serially disposed in the radial direction is performed by using a modified U-shaped conductor segment inserting into vacant conductor accommodation positions of two partial phase coils disposed adjacently to each other in the radial direction.

For example, a pair of vacant conductor accommodation positions can be obtained for each partial phase coil by removing an ordinary conductor segment (preferably, a large-turning conductor segment). Hence, the partial phase coil U12 can be connected to the partial phase coil U13 by using a modified U-shaped conductor segment inserted at one end into one of two vacant conductor accommodation positions of the partial phase coil U12 having been thus obtained and also inserted at the other end into one of two vacant conductor accommodation positions of the partial phase coil U13.

Furthermore, the partial phase coil U12 can be connected to the partial phase coil U11 by using another modified U-shaped conductor segment inserted at one end into the other vacant conductor accommodation position of the partial phase coil U12 and also inserted at the other end into one of two vacant conductor accommodation positions of the partial phase coil U11.

A modified conductor segment for a neutral point (or for a leader terminal) is inserted into the remaining vacant conductor accommodation position of the partial phase coil U11. Similarly, a modified conductor segment for a leader terminal (or for a neutral point) is inserted into the remaining vacant conductor accommodation position of the partial phase coil U14.

The serial phase coil circuits U1, U2, and U3 are connected at both ends in parallel with each other so as to constitute the U-phase coil.

First explained hereinafter are standard manufacturing processes for the ordinary stator coil including sequentially-connected conductor segments. Then, the manufacturing processes in accordance with this embodiment will follow them.

Standard Head End Twisting Process

First of all, a required number of two kinds of pine-needle shaped conductor segments, being later expanded into the small conductor segments 332 and also into the large conductor segments 331, are prepared. Each prepared pine-needle shaped conductor segment has two elongated legs neighboring to each other and extending straight from its head being sharply bent. Next, each pine-needle shaped conductor segment is configured into a U-shaped conductor segment with a pair of in-slot conductor portions angularly spaced by one pole pitch in the circumferential direction. Then, the U-shaped conductor segments are spatially disposed (more specifically, aligned in the circumferential direction) so that a required number of conductor segments are simultaneously inserted into each slot of the stator core.

Hereinafter, the process of twisting the head conductor portion will be explained with reference to FIGS. 5 and 6.

Figure 5:
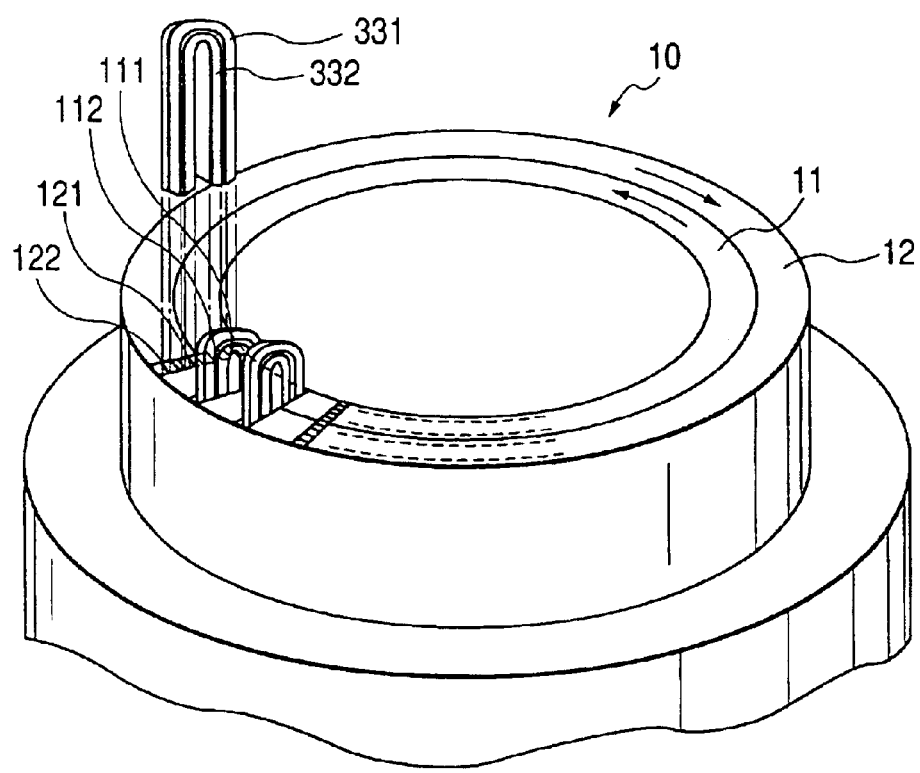
FIG. 5 is a perspective view schematically showing the condition of conductor segments inserted into rings of a head end twisting apparatus.

FIG. 5 shows a condition of the conductor segments not being completely inserted into the twisting apparatus. In FIG. 5, reference numeral 10 represents a head end twisting apparatus, reference numeral 11 represents a small ring, and reference numeral 12 represents a large ring. The small ring 11 and the large ring 12 are disposed coaxially and rotatable in the circumferential direction to cause an angular shift between them. The small ring 11 has two lines of holes 111 and 112 aligned in the circumferential direction at the predetermined pitches. The line of holes 111 is positioned radially inside the line of holes 112. Similarly, the large ring 12 has two lines of holes 121 and 122 aligned in the circumferential direction at the same pitches as those of the holes 111 and 112. The line of holes 121 is positioned radially inside the line of holes 122. The holes 111, 112, 121, and 122 are aligned on a radial direction. One of two in-slot conductor portions of the large conductor segment (i.e., large-turning conductor segment) 331 is inserted into the innermost hole 111, while the other in-slot conductor portion of the large conductor segment 331 is inserted into the outermost hole 122. One of two in-slot conductor portions of the small conductor segment (i.e., small-turning conductor segment) 332 is inserted into the second inner most hole 112, while the other in-slot conductor portion of the small conductor segment 332 is inserted into the second outermost hole 121.

Figure 6:
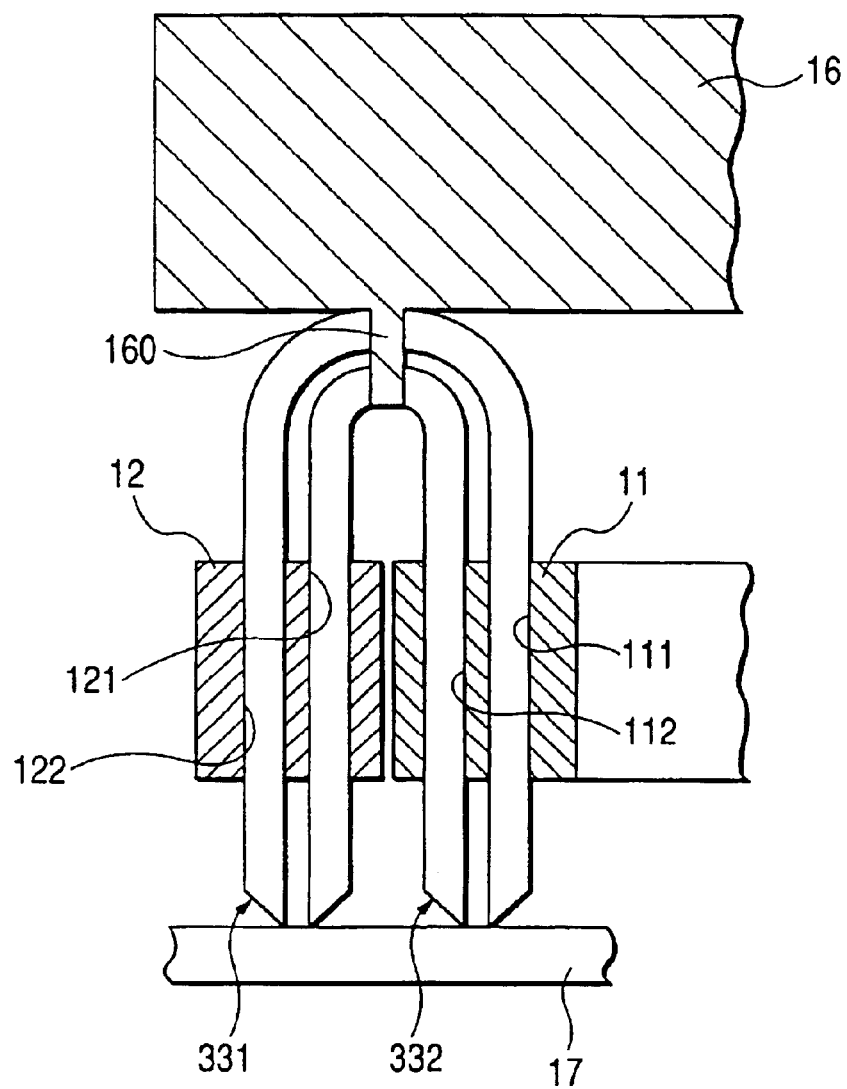
FIG. 6 is a vertical cross-sectional view showing the head end twisting apparatus.

FIG. 6 shows a condition of the large conductor segments 331 and the small conductor segments 332 which are completely inserted into the holes 111, 112, 121, and 122 of the small ring 11 and the large ring 12. As shown in FIG. 6, a head portion pressing plate 16 is disposed axially above the small ring 11 and the large ring 12. The head portion pressing plate 16 is equipped with a pair of claws 160 (although only one claw is shown in the drawing) which is used to clamp the head portions of the large conductor segment 331 and the small conductor segment 332 at their top from both circumferential sides when these conductor segments 331 and 332 are disposed as a pair on the same circumferential position. More specifically, after respective conductor segments 33 are inserted into the holes 111, 112, 121, and 122, the head portion pressing plate 16 is lowered from above. Then, the claws 160 attached beneath the head portion pressing plate 16 clamp the head portions of the paired large and small conductor segment 331 and 332, disposed at the same circumferential position, at their top from both circumferential sides.

Thereafter, the large ring 12 and the small ring 11 are rotated in circumferential opposed directions by a half pole pitch relative to the stationary head portion pressing plate 16. With this operation, two legs of each conductor segment are expanded in the circumferential direction to have a circumferential gap equivalent to one pole pitch. As a result, each of the large conductor segments 331 and the small conductor segments 332 is configured to have a head conductor portion having a U-shaped head top portion, and a pair of head slanting portions extending obliquely in both circumferential and axial directions from the head top portion and respectively connected to the in-slot conductor portions.

During the rotation of the rings 11 and 12, the top of the head portion of each conductor segment 33 shifts in the axial direction toward the rings 11 and 12 in accordance with the rotation of the rings 11 and 12. The head portion pressing plate 16 moves in the axial direction together with the head portions of respective conductor segments 33. A stopper plate 17 prevents the large conductor segment 331 and the small conductor segment 332 from falling deeply. It is possible to divide the stopper plate 17 into an outer stopper plate and an inner stopper plate. In this case, the outer stopper plate mounts two legs positioned at the radially outer side, while the inner stopper plate mounts two legs positioned at the radially inner side. It is preferable that the inner stopper plate is fixed to the ring 11 and rotates together with the ring 11. The outer stopper plate is fixed to the ring 12 and rotates together with the ring 12.

Next, while the head portion pressing plate 16 holds respective conductor segments 33, the small ring 11 and the large ring 12 are disengaged from the conductor segments 33.

Standard Tail Portion Installing Process

Next, the small U-shaped turning conductor segments 332 are pulled out of the insertion holes of the above-described rings. As representatively shown in FIG. 4, the small U-shaped turning conductor segments 332 are installed into the slots 35 of stator core 1 so as to straddle between a position corresponding to the inner middle layer and a position corresponding to the outer middle layer. Similarly, the large U-shaped turning conductor segments 331 are pulled out of the insertion holes of the above-described rings. Then, the large U-shaped turning conductor segments 331 are installed into the slots 35 of stator core 1 so as to straddle between a position corresponding to the innermost layer and a position corresponding to the outermost layer. In this case, the small U-shaped turning conductor segments 332 and the large U-shaped turning conductor segments 331 are assembled together with the above-described head portion pressing plate 16 so that respective conductor segments can be installed into corresponding slots 35 at a time. After accomplishing installation of respective conductor segments into the slots 35 of stator core 1, the head portion pressing plate 16 is removed.

The processes of installing the small U-shaped turning conductor segments 332 and the large U-shaped turning conductor segments 331 into the slots 35 are not limited to the above-described ones, and accordingly can be variously modified.

Standard Tail End Twisting Process

Next, the process for twisting the tail conductor portion of the conductor segment 33 inserted in the slot of the stator will be explained hereinafter.

According to this embodiment, the large conductor segment 331 includes the outermost layer in-slot conductor portion 331b and the tail conductor portion 331g. The tail conductor portion 331g (which may be referred to as an outer layer side end portion), connected to the outermost layer in-slot conductor portion 331b, is twisted in a predetermined circumferential direction. Furthermore, the large conductor segment 331 includes the innermost layer in-slot conductor portion 331a and the tail conductor portion 331f. The tail conductor portion 331f (which may be referred to as an inner layer side end portion), connected to the innermost layer in-slot conductor portion 331a, is twisted in the opposite circumferential direction.

Similarly, the small conductor segment 332 includes the inner middle layer in-slot conductor portion 332a and the tail conductor portion 332f. The tail conductor portion 332f (which may be referred to as an inner layer side end portion), connected to the inner middle layer in-slot conductor portion 332a, is twisted in the predetermined circumferential direction. Furthermore, the small conductor segment 332 includes the outer middle layer in-slot conductor portion 332b and the tail conductor portion 332g. The tail conductor portion 332g (which may be referred to as an outer layer side end portion), connected to the outer middle layer in-slot conductor portion 332b, is twisted in the opposite circumferential direction.

A sum of the circumferential twist amount of the tail conductor portion 331f and the circumferential twist amount of the tail conductor portion 332f is equivalent to one pole pitch. A sum of the circumferential twist amount of the tail conductor portion 331g and the circumferential twist amount of the tail conductor portion 332g is equivalent to one pole pitch.

Figure 7:
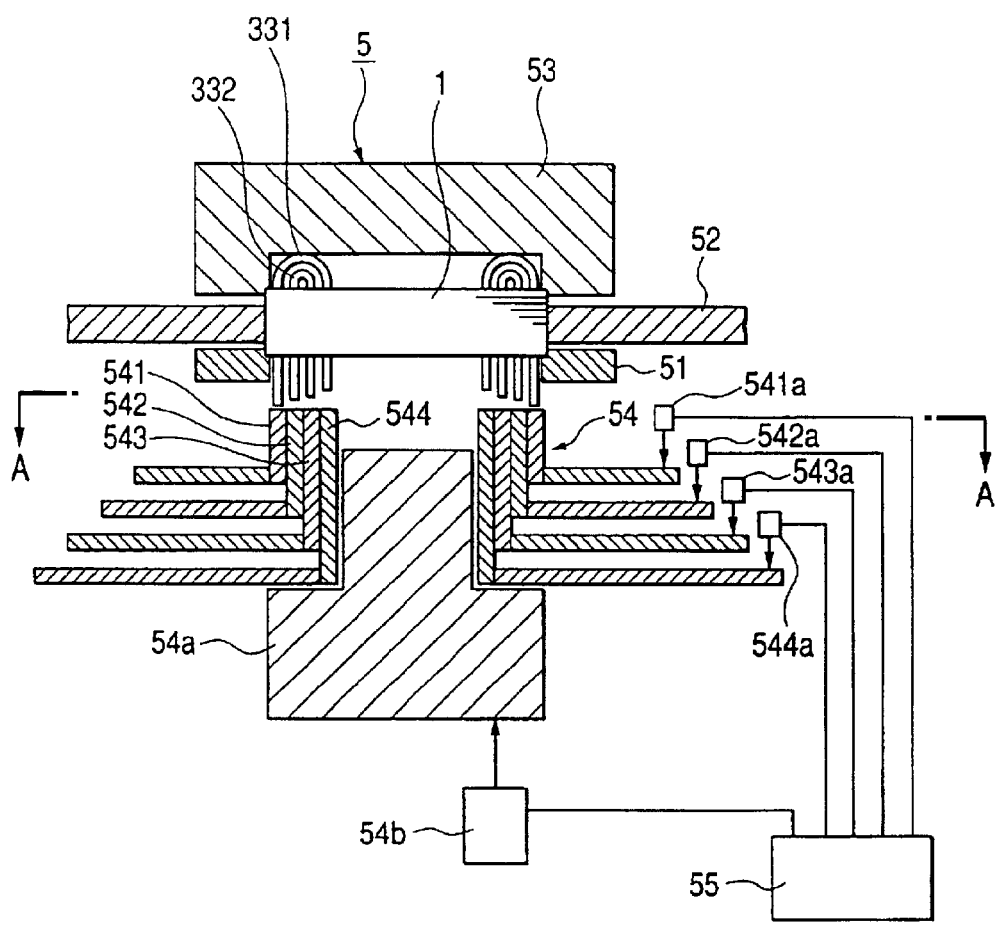
FIG. 7 is a vertical cross-sectional view showing a tail end twisting apparatus.
Figure 8:
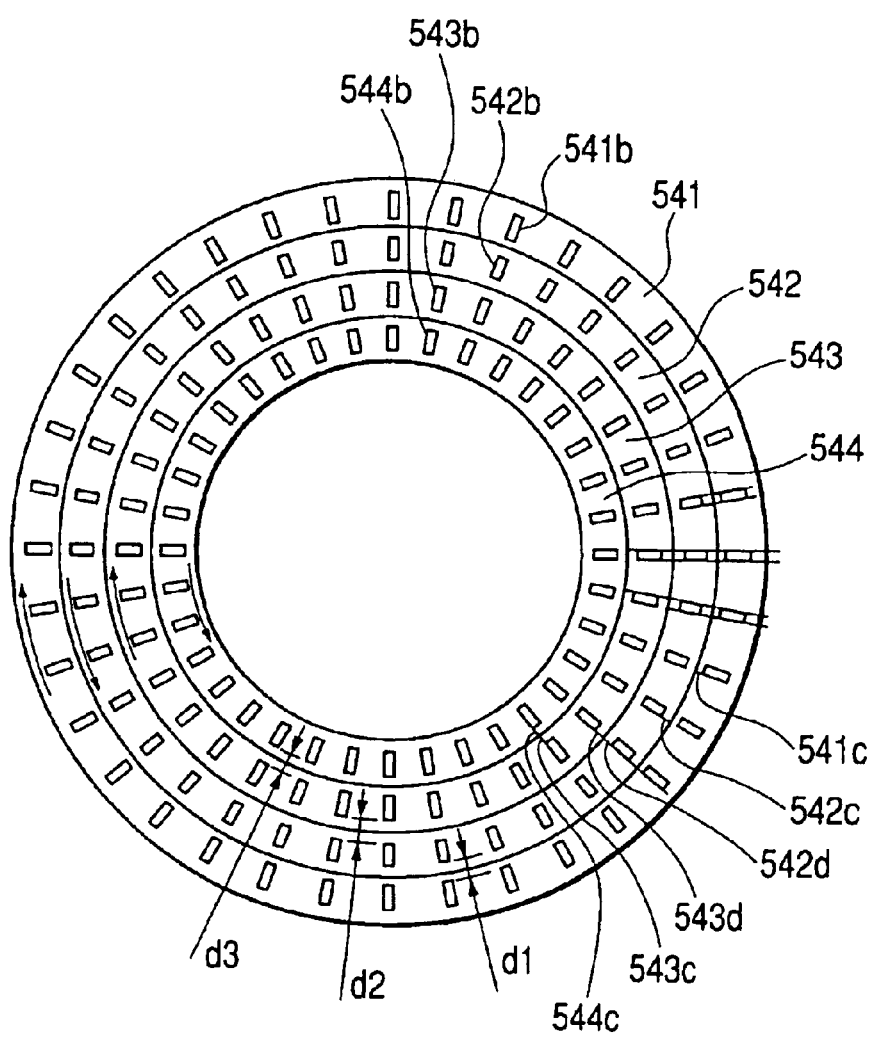
FIG. 8 is a plan view showing the tail end twisting apparatus.

The process for twisting the large conductor segment 331 and the small conductor segment 332 will be explained in more detail with reference to FIGS. 7 and 8. FIG. 7 is a vertical cross-sectional view schematically showing a stator coil twisting apparatus 500. FIG. 8 is a cross-sectional view taken along a line A—A of FIG. 7.

First, the arrangement of the stator coil twisting apparatus 500 will be explained.

The stator coil twisting apparatus 500 includes a work receiver 51 for receiving an outer peripheral portion of the stator core 1, a damper 52 for regulating the movement of stator core 1 in the radial direction and for holding the stator core 1, a work presser 53 for preventing the stator core 1 from raising upward, a twist shaping unit 54 for twisting the legs of the segment 33 protruding from one end of the stator core 1, an elevating shaft 54a for shifting the twist shaping unit 54 in the axial direction, a plurality of rotary driving mechanisms 541a to 544a for rotating the twist shaping unit 54 in the circumferential direction, an axial driving mechanism 54b for shifting the elevating shaft 54a in the axial direction, and a controller 55 for controlling each of the rotary driving mechanisms 541a to 544a and the axial driving mechanism 54b.

The twist shaping unit 54 includes a total of four cylindrical twisting jigs 541 to 544 which are coaxially disposed, with their top end surfaces being arranged at the same height. The rotary driving mechanisms 541a to 544a independently rotate the corresponding cylindrical twisting jigs 541 to 544. The axial driving mechanism 54b shifts the elevating shaft 54a in the up-and-down direction so that all of the cylindrical twisting jigs 541 to 544 can be integrally raised or lowered.

As shown in FIG. 8, the twisting jigs 541 to 544 have conductor segment insertion holes 541b to 544b, on their top end surfaces, for receiving the distal ends (i.e., joint portions) of the tail conductor portions 331f, 331g, 332f, and 332g of the conductor segment 33 inserted into the slots of the stator core 1. The number of conductor segment insertion holes 541b to 544b is equal to the number of the slots 35 of stator core 1. The conductor segment insertion holes 541b to 544b are angularly spaced in the circumferential direction at predetermined intervals so as to correspond to the slots 35 of stator core 1.

The conductor segment insertion holes 541b to 544b, as shown in FIG. 8, are provided with partition walls 541c to 544c, 542d, and 543d for preventing the conductor segment insertion holes 541b to 544b which are adjacent to each other in the radial direction from communicating with each other. The thickness of respective partition walls 541c to 544c, 542d, and 543d is determined in the following manner. The neighboring partition walls 541c and 542c cooperatively form a gap d1 at the boundary between the outermost layer and the outer middle layer. The neighboring partition walls 542d and 543d cooperatively form a gap d2 at the boundary between the outer middle layer and the inner middle layer. The neighboring partition walls 543c and 544c cooperatively form a gap d3 at the boundary between the inner middle layer and the innermost layer. The gap d2 is set to be larger than the gap d1 or the gap d3.

The stator coil twisting apparatus 500 has the following function.

The stator core 1, with the conductor segments 33 disposed in its slots 35, is placed on the work receiver 51. Next, the outer cylindrical wall of the stator core 1 is fixed with the clamper 52. Thereafter, the work presser 53 depresses the upper portion of the stator core 1 as well as the head conductor portions 331c of the large-turning conductor segments 331. Thus, the stator core 1 and the conductor segments 33 are surely fixed so as not to move in the up-and-down direction.

After the stator core 1 with the conductor segments 33 installed therein is fixed by using the damper 52 and the work receiver 53, the elevating shaft 54a raises the twist shaping unit 54 so that the tail conductor portions 331f, 331g, 332f, and 332g of respective conductor segments 33 are inserted into the conductor segment insertion holes 541b to 544b formed in respective twisting jigs 541 to 544.

The conductor segment insertion holes 541b to 544b can receive only the distal ends (which later become the joint portions) of tail conductor portions 331f, 331g, 332f, and 332g of respective conductor segments 33. As the tail conductor portions 331f, 331g, 332f, and 332g of respective conductor segments 33 are tapered, they can be smoothly inserted into the conductor segment insertion holes 541b to 544b.

After the tail conductor portions 331f, 331g, 332f, and 332g of respective conductor segments 33 are inserted into the conductor segment insertion holes 541b to 544b of the twist shaping unit 54, the twist shaping unit 54 is rotated by the rotary driving mechanisms 541a to 544a and raised or lowered by the axial driving mechanism 54b.

Hereinafter, rotation of the twist shaping unit 54 is explained.

The twisting jigs 541 and 543 are rotated in the clockwise direction by a first angle, while the twisting jigs 542 and 544 are rotated in the counterclockwise direction by a second angle. The first angle needs not to be equal to the second angle. However, a sum of the first angle and the second angle is equal to a required slot pitch.

Thereafter, the twist shaping unit 54 is rotated by the rotary driving mechanisms 541a to 544a and raised by the axial driving mechanism 54b so that the elongated portions of the tail conductor portions 331f, 331g, 332f, and 332g of respective conductor segments 33 extending from the outlet of the slots 35 to the inlet of the conductor segment insertion holes 541b to 544b are maintained to have a constant length. In this case, it is preferable that the tail conductor portions 331f, 331g, 332f, and 332g of respective conductor segments 33 rotate and rise so as to trace an arc locus. Considering spring back deformation of respective conductor segments 33, the operation for twisting the tail conductor portions so as to trace an arc locus is performed until the angle exceeds a regulation angle equivalent to a half pole pitch (T/2) by a predetermined amount.

Thereafter, the axial driving mechanism 54b and the rotary driving mechanisms 541a to 544a are controlled to rotate the twist shaping unit 54 in the opposite direction and lower it. After finishing the twisting process of respective conductor segments 33 in this manner, the twist shaping unit 54 is further lowered to remove the tail conductor portions 331f, 331g, 332f, and 332g of respective conductor segments 33 out of the conductor segment insertion holes 541b to 544b of the twisting jigs 541 to 544. After the conductor segments 33 are removed from the twist shaping unit 54, the rotary driving mechanisms 541a to 544a rotate the twist shaping unit 54 to return it to the original position. Finally, the damper 52 and the work presser 53 are disengaged from the stator core 1. Then, the stator with the twisted conductor segments 33 is taken out.

After all, the above-described twisting process is characterized by first deforming the tail conductor portions of respective conductor segments 33 in only the circumferential direction to make the conductor segments 33 incline in the circumferential direction, then deforming the tail conductor portions of respective conductor segments 33 in both the circumferential direction and the axial direction to make the conductor segments 33 incline deeply, and thereafter excessively deforming the tail conductor portions of respective conductor segments 33 in both the circumferential direction and the axial direction beyond the regulation values to make the conductor segments 33 incline excessively, and finally letting the tail conductor portions of respective conductor segments 33 return to the regulation values due to self spring back deformation.

The twist shaping unit 54 causes the shift movement relative to the stator core 1 not only the circumferential direction but also in the axial direction. Hence, it becomes possible to twist the tail conductor portions 331f, 331g, 332f, and 332g of respective conductor segments 33 so as to trace an arc locus, according to which the length of the tail conductor portions 331f, 331g, 332f, and 332g except for the joint portions 331d, 331e, 332d, and 332e can be kept to a constant value. In other words, the elongated portions of the tail conductor portions 331f, 331g, 332f, and 332g of respective conductor segments 33 extending from the outlet of the slots 35 to the inlet of the conductor segment insertion holes 541b to 544b can be maintained to a constant length. As a result, it becomes possible to prevent the conductor segments 33 from being pulled out of the conductor segment insertion holes 541b to 544b.

Furthermore, only the joint portions 331d, 331e, 332d, and 332e of the conductor segments 33 are inserted into the conductor segment insertion holes 541b to 544b. As described above, this prevents the conductor segments 33 from being pulled out of the conductor segment insertion holes 541b to 544b.

Standard Welding Process

Next, the succeeding standard welding process will be explained. This welding process is substantially the same as the conventional one.

After the twisting process of the conductor segments is accomplished, the conductor segment of the innermost layer and the conductor segment of the inner middle layer are welded at their distal ends (i.e., the joint portions) as shown in FIGS. 1 and 2. Similarly, the conductor segment of the outermost layer and the conductor segment of the outer middle layer are welded at their distal ends (i.e., the joint portions). The stator coil 3 is thus accomplished. The practical welding used in this embodiment is, for example, arc welding.

Explanation of Pine-needle Shaped Conductor Segment

Figure 10:
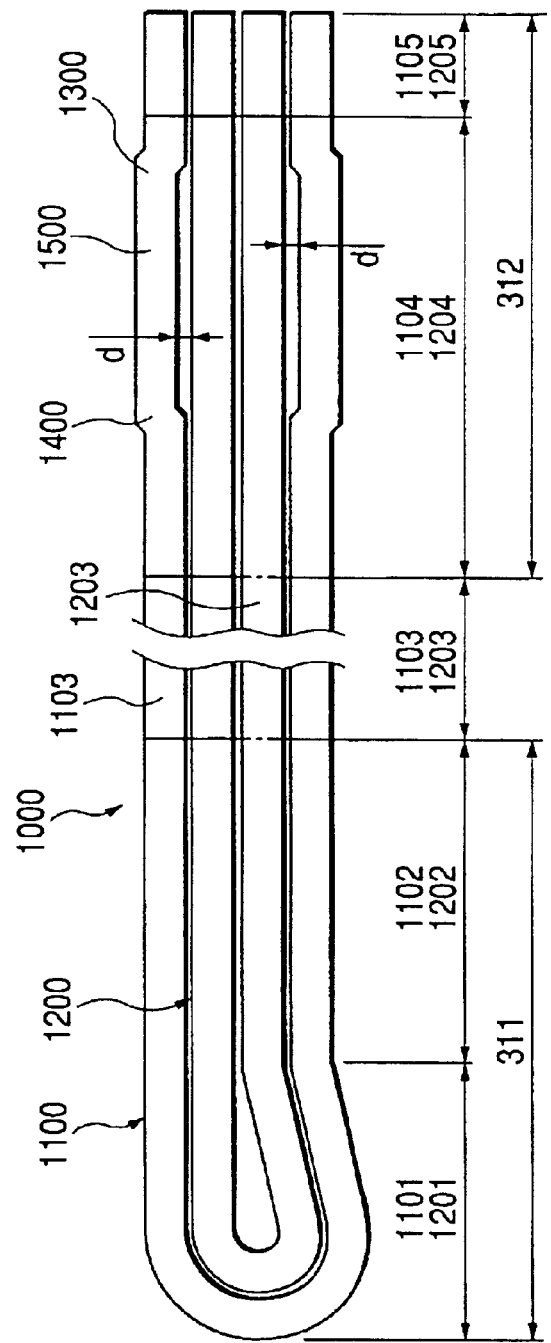
FIG. 10 is a side view showing a non-expanded conductor segment set in accordance with a preferred embodiment of the present invention.

Next, the configuration of a non-expanded conductor segment set 1000 constituting the characteristic features of this embodiment will be explained. FIG. 10 is a side view showing the non-expanded conductor segment set 1000.

The non-expanded or non-developed conductor segment set 1000 includes a non-expanded large-turning conductor segment 1100 (i.e., large-turning pine-needle shaped conductor segment) and a non-expanded small-turning conductor segment 1200 (i.e., small-turning pine-needle shaped conductor segment). The large-turning conductor segment 1100 surrounds the small-turning conductor segment 1200.

The large-turning conductor segment 1100 consists of a curved head portion 1101 and a pair of straight leg portions. The leg portion consists of a straight portion (for the head slanting portion) 1102, an in-slot conductor portion 1103, a straight portion (for the tail slanting portion) 1104, and a straight portion (for the tail joint portion) 1105. The straight portion 1102 is a portion to be later expanded (or twisted) into the head slanting portion. The straight portion 1104 is a portion to be later expanded (or twisted) into the tail slanting portion. The straight portion 1105 is a portion to be later expanded (twisted) into the tail joint portion. The head portion 1101 and the straight portion (for the head slanting portion) 1102 cooperatively constitute the head side coil end 311 when accomplished. The straight portion (for the tail slanting portion) 1104 and the straight portion (for the tail joint portion) 1105 cooperatively constitute the tail side coil end 312 when accomplished.

The small-turning conductor segment 1200 consists of a curved head portion 1201 and a pair of straight leg portions. The leg portion consists of a straight portion (for the head slanting portion) 1202, an in-slot conductor portion 1203, a straight portion (for the tail slanting portion) 1204, and a straight portion (for the tail joint portion) 1205. The straight portion 1202 is a portion to be later expanded (or twisted) into the head slanting portion. The straight portion 1204 is a portion to be later expanded (or twisted) into the tail slanting portion. The straight portion 1205 is a portion to be later expanded (twisted) into the tail joint portion. The head portion 1201 and the straight portion (for the head slanting portion) 1202 cooperatively constitute the head side coil end 311 when accomplished. The straight portion (for the tail slanting portion) 1204 and the straight portion (for the tail joint portion) 1205 cooperatively constitute the tail side coil end 312 when accomplished. The straight portions (for the tail joint portion) 1105 and 1205 are welded with each other after the insulation films are removed.

According to this embodiment, the straight portion (for the tail slanting portion) 1104 of the large-turning conductor segment 1100 has a swerved portion 1500 which bends from a portion adjacent to the straight portion (for the tail joint portion) 1105 toward the direction departing from the straight portion (for the tail slanting portion) 1204 of the small-turning conductor segment 1200. A recessed portion (i.e., clearance) d is provided between the straight portions 1104 and 1204. The axial width of the clearance d is set to include a crossing portion of the straight portion (for the tail slanting portion) 1104 and the straight portion (for the tail joint portion) 1105 which are adjacently disposed so as to obliquely cross with each other when expanded.

According to the above-described arrangement, when the straight portions (for the tail joint portions) 1105 and 1205 are welded, the straight portions (for the tail slanting portions) 1104 and 1204 are not brought into contact with each other and do not fuse and deform when subjected to the heat caused during the welding operation. Thus, the electric insulation between the straight portions (for the tail slanting portions) 1104 and 1204 can be adequately maintained.

According to this embodiment, the recessed portion (i.e., clearance) d is formed along the entire region where the straight portions (for the tail slanting portions) 1104 and 1204 are adjacently disposed so as to obliquely cross with each other. Alternatively, it is possible to narrowly limit the recessed portion (i.e., clearance) d to the vicinity of the straight portions (for the tail joint portions) 1105 and 1205 which are severely subjected to the welding heat. The straight portion (for the tail slanting portion) 1104 has bent portions 1300 and 1400 continuously formed at both ends of the swerved portion 1500. The width and the cross-sectional shape of the swerved portion 1500 are the same with those of the remaining part of the straight portion (for the tail slanting portion) 1104 of the large-turning conductor segment 1100.

The above-described conductor segment set 1000, after the straight portions 1102 and 1202 are expanded into the head slanting portions, is inserted into the slots 35 of the stator core 1. In this case, it is preferable that the conductor segment set being positioned at the radially outermost or innermost side is inserted last after finishing the installation of other conductor segment sets. This effectively prevents the bent portions of the straight portion (for the tail slanting portion) 1104 from being hooked or suppresses the increase in the radial depth of the slot 35.

Modified Embodiment

Figure 11:
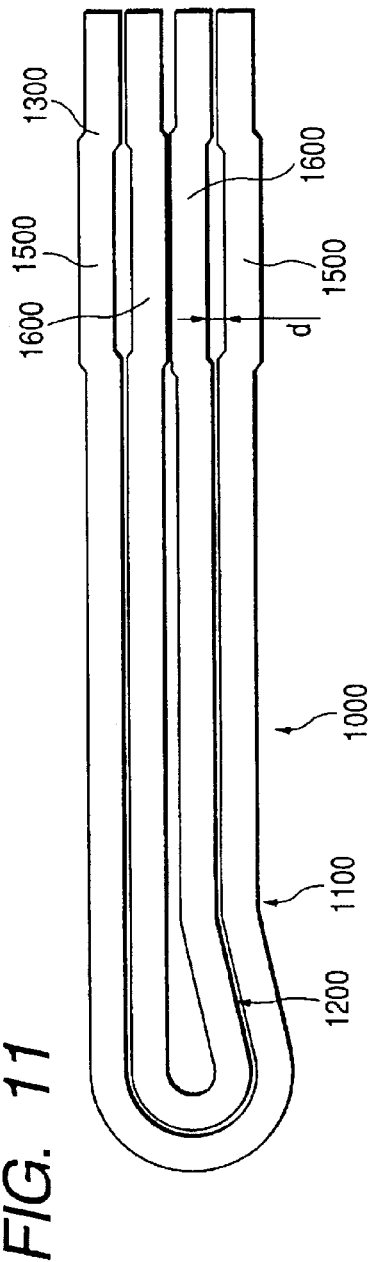
FIG. 11 is a side view showing a non-expanded conductor segment set in accordance with a modified embodiment of the present invention.

FIG. 11 shows a modified embodiment of the present invention.

This modified embodiment is different from the embodiment shown in FIG. 10 in that the straight portion (for the tail slanting portion) 1204 of the small-turning conductor segment 1200 has a swerved portion 1600 which bends toward the direction departing from the large-turning conductor segment 1100. According to this embodiment, the recessed portion (i.e., clearance) d is provided between the swerved portion 1500 of the large-turning conductor segment 1100 and the swerved portion 1600 of the small-turning conductor segment 1200. According to this arrangement, the bent amount at the swerved portion 1500 or 1600 of each conductor segment 1100 or 1200 can be reduced to a half value. The stress acting on the insulation film covering the bent portions 1300 and 1400 can be reduced. The width and the cross-sectional shape of the swerved portion 1600 are the same with those of the remaining part of the straight portion (for the tail slanting portion) 1204 of the small-turning conductor segment 1200.

Modified Embodiment

Figure 12:
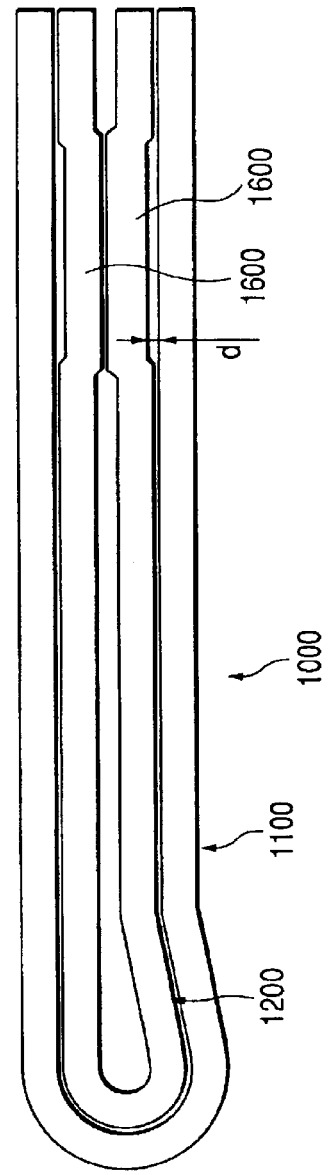
FIG. 12 is a side view showing a non-expanded conductor segment set in accordance with another modified embodiment of the present invention.
Figure 13:
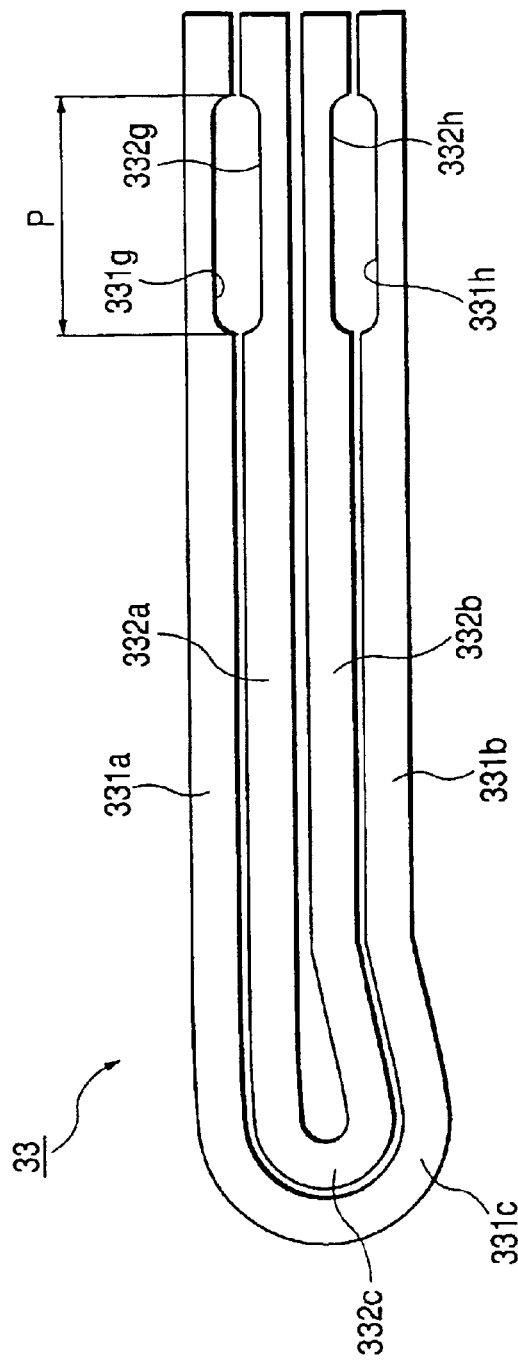
FIG. 13 is a side view showing a conventional conductor segment set with recessed portions.
Figure 14:
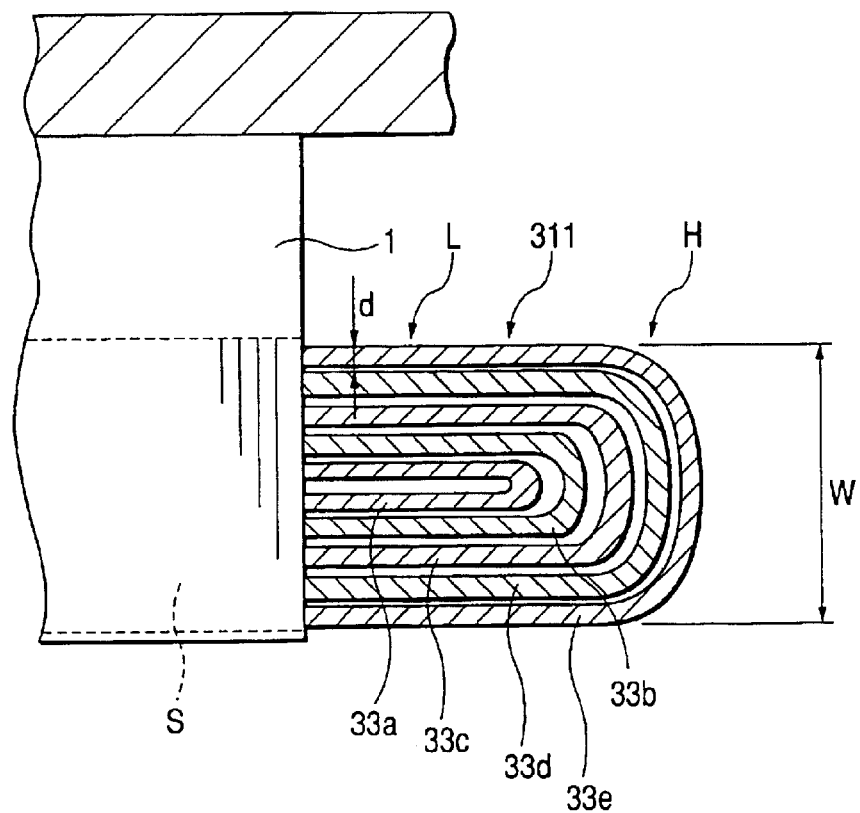
FIG. 14 is a cross-sectional view showing a head side coil end of a conventional conductor segment set.

FIG. 12 shows a modified embodiment of the present invention.

This modified embodiment is different from the embodiment shown in FIG. 10 in that the large-turning conductor segment 1100 has no swerved portion while the small-turning conductor segment 1200 has the swerved portion 1600 which bends toward the direction departing from the large-turning conductor segment 1100. This embodiment brings substantially the same effects as those of the embodiment shown in FIG. 10.

Modified Embodiment

Another modified embodiment of the present invention will be explained.

This modified embodiment is characterized in that only the bent portion 1300 is formed while the other bent portion 1400 is omitted from the arrangement shown in FIG. 10. The most important thing is to prevent the insulation film covering the vicinity of the straight portion (for the tail joint portion) 1105 from being excessively heated and softened. The influence of welding heat given to the insulation film becomes small with increasing distance from the straight portion (for the tail joint portion) 1105. This is the reason why the bent portion 1400 can be omitted, without losing the above-described effects.

Explanation of Tail Side Coil End 312

Hereinafter, the configuration of the tail side coil end 312 will be explained.

As shown in FIG. 1, each tail conductor pairs (i.e., tail slanting portions bonded at their tail joint portions) inclinedly extend from an end surface 100 of the stator core 1 or from the point being slightly offset from the end surface 100. The tail conductor pairs incline radially outward with predetermined tilt angles, respectively, with respect to the axis of the stator coil 1.

Adopting this arrangement makes it possible to secure a sufficient radial gap between the tail joint portions disposed adjacently to each other in the radial direction, and also makes it possible to greatly reduce the radial pitch of the in-slot conductor portions inserted in the slot. As a result, the welding work can be done easily without lowering the reliability of the welded portions. The space factor of the slot can be improved. The radial size of the stator core can be decreased so as to realize a compact and light-weight motor.

Especially, during the work for welding the tail joint portions, the insulation film covering the tail slanting portion closer to the tail joint portion may be heated and softened. However, according to the above-described embodiment, it is possible to secure a sufficient radial gap between the tail joint portions disposed adjacently to each other in the radial direction, at the portion closer to the tail joint portions. Thus, the above-described embodiment prevents the melted or softened insulation film from deforming to merge with other insulation film, thereby properly maintaining the electric insulation between the tail slanting portions. This is preferable, especially, for the drive motor or other high-voltage motors.

In manufacturing the tail side coil end 312, the tail slanting portions inserted in the slots of the stator core are simultaneously tilted toward the radially outer side along the entire periphery of the stator core. The the tail slanting portions incline to the radially outer side at the same time. According to this method, the gap between neighboring conductor segment sets disposed next to each other in the radial direction can be widened in the vicinity of the tail joint portions compared with the gap in the vicinity of the end surface of the stator core. The tilt angle of the tail slanting portions toward the radially outer side is dependent on the radial position of respective tail slanting portions. The tail slanting portion positioned at the radially outer side has a larger tilt angle.

What is claimed is:

1. A stator coil including sequentially-connected conductor segments for an electric rotary machine, comprising:

a plurality of conductor segments accommodated in a slot of a stator core having an even number of conductor accommodation positions serially aligned in the radial direction, said conductor segments being sequentially connected to cooperatively constitute one turn of a phase coil of an M-phase (M is an integer not smaller than 3) armature coil, each of said conductor segments having a pair of in-slot conductor portions separately accommodated into the conductor accommodation positions of two different slots mutually spaced by a predetermined pitch, a head conductor portion continuously extending from said in-slot conductor portions and protruding from one end of said stator core so as to constitute a head side coil end, and a pair of tail conductor portions continuously extending from said in-slot conductor portions and protruding from the other end of said stator so as to constitute a tail side coil end, said head conductor portion having a U-shaped head top portion, and a pair of head slanting portions extending obliquely in both circumferential and axial directions from said head top portion and respectively connected to said in-slot conductor portions, said tail conductor portions having a pair of tail slanting portions extending obliquely in both circumferential and axial directions from said pair of in-slot conductor portions, and tail joint portions formed at distal ends of said tail slanting portions and bonded to tail conductor portions of other conductor segment, said head side coil end including a plurality of said head conductor portions serially disposed in the radial direction when seen from the circumferential direction, and said tail side coil end including a plurality of said tail conductor portions serially disposed in the radial direction when seen from the circumferential direction, wherein said conductor segments include a small-turning conductor segment inserted into a pair of said conductor accommodation positions disposed next to each other in the radial direction, and a large-turning conductor segment inserted into another pair of said conductor accommodation positions respectively disposed next to said pair of conductor accommodation positions in the radial direction, the tail joint portion of said large-turning conductor segment is bonded to the tail joint portion of the small-turning conductor segment located adjacently in the radial direction, the tail slanting portion of said large-turning conductor segment or said small-turning conductor segment has a swerved portion which bends toward a direction departing from the opposed conductor segment so as to expand a radial clearance between said large-turning conductor segment and said small-turning conductor segment at a crossing portion of the tail slanting portion of said large-turning conductor segment and the tail slanting portion of said small-turning conductor segment which are adjacently disposed in the radial direction.

2. The stator coil including sequentially-connected conductor segments for an electric rotary machine in accordance with claim 1, wherein a plurality of conductor segment sets, each consisting of said large-turning conductor segment and said small-turning conductor segment, are disposed in the radial direction, and a gap between a pair of conductor segment sets disposed next to each other in the radial direction and a gap between a pair of small-turning conductor segments disposed next to each other in the radial direction are widened in the vicinity of said tail joint portions compared with the gaps in the vicinity of an end surface of said stator core.

3. The stator coil including sequentially-connected conductor segments for an electric rotary machine in accordance with claim 2, wherein a plurality of conductor segment sets each being constituted by the small-turning conductor segment and the large-turning conductor segment are disposed in the radial direction, said small-turning conductor segment including a small-turning head portion continuously formed with a pair of said in-slot conductor portions accommodated separately into a pair of said conductor accommodation positions disposed next to each other in the radial direction, and said large-turning conductor segment including a large turning head portion straddling in the radial direction so as to surround said small-turning head portion, a group of said conductor segment sets is located at the same radial position and disposed in the circumferential direction to constitute a partial phase coil to which a predetermined phase voltage is applied, and said phase coil is constituted by serially connecting a plurality of partial phase coils having different radial positions and disposed sequentially in the radial direction.

4. The stator coil including sequentially-connected conductor segments for an electric rotary machine in accordance with claim 3, wherein an inphase slot group is constituted by a plurality of said slots adjacently and continuously disposed in the circumferential direction for accommodating in-slot conductor portions to which a same inphase voltage is applied, a plurality of serial phase coil circuits are accommodated in different slots of the inphase slot group, each serial phase coil circuit including serially connected said partial phase coils accommodated in the same slot and disposed sequentially in the radial direction to have different radial positions, and said phase coil is constituted by connecting said plurality of serial phase coil circuits in parallel with each other.

* * * * *